(12) United States Patent
Harges et al.

(10) Patent No.: US 7,302,784 B2
(45) Date of Patent: Dec. 4, 2007

(54) VACUUM PACKAGING MACHINE

(75) Inventors: Steven Daniel Harges, Warsaw, IN (US); Rodney Dale Patch, Fort Wayne, IN (US)

(73) Assignee: DePuy Products, Inc., Warsaw, IN (US)

( * ) Notice: Subject to any disclaimer, the term of this patent is extended or adjusted under 35 U.S.C. 154(b) by 1045 days.

(21) Appl. No.: 10/256,982

(22) Filed: Sep. 27, 2002

(65) Prior Publication Data

US 2004/0060262 A1    Apr. 1, 2004

(51) Int. Cl.
*B65B 31/00* (2006.01)
(52) U.S. Cl. .......................................... 53/434; 53/512
(58) Field of Classification Search ................ 53/428, 53/432, 434, 52, 510, 512
See application file for complete search history.

(56) References Cited

U.S. PATENT DOCUMENTS

| 3,958,391 A | * | 5/1976 | Kujubu ........................ 53/434 |
| 4,164,111 A | * | 8/1979 | Di Bernardo ................. 53/434 |
| 4,378,266 A | | 3/1983 | Gerken |
| 4,469,545 A | | 9/1984 | Low |
| 4,640,081 A | * | 2/1987 | Kawaguchi et al. .......... 53/512 |
| 4,941,310 A | * | 7/1990 | Kristen ......................... 53/512 |
| 5,044,142 A | * | 9/1991 | Gianelli ........................ 53/434 |
| 5,386,678 A | * | 2/1995 | Kujubu ........................ 53/512 |
| 5,655,357 A | * | 8/1997 | Kristen ......................... 53/512 |
| 5,682,727 A | * | 11/1997 | Harte et al. ................... 53/512 |
| 6,256,968 B1 | * | 7/2001 | Kristen ......................... 53/512 |

FOREIGN PATENT DOCUMENTS

| GB | 1284509 | 8/1972 |
| GB | 2275442 | 8/1994 |

* cited by examiner

*Primary Examiner*—Louis Huynh
(74) *Attorney, Agent, or Firm*—Maginot, Moore & Beck

(57) ABSTRACT

A vacuum packaging machine includes a vacuum chamber and a sealing mechanism within the chamber. A product-filled package can be supported within the chamber with its open end disposed between sealing bars of a sealing mechanism. At least one of the sealing bars is continuously heated including as the package is placed within the chamber, as a vacuum is drawn in the chamber, as the sealing bars are closed around the open end of the package and as the package is removed after sealing is complete.

18 Claims, 2 Drawing Sheets

VACUUM PACKAGING MACHINE

BACKGROUND OF THE INVENTION

The present invention relates to a vacuum chamber packaging machine, and particularly to the system for sealing an opening of a package within the vacuum chamber.

In many packaging applications it is necessary to remove substantially all air from the interior of the package. Thus, many packaging machines have been developed that pull a vacuum through the open end of a package and then seal the open end while the vacuum is maintained. The package can contain a variety of products, but especially products that require a modified atmosphere, such as a sterilized and/or oxygen free environment. In addition, the process of vacuum packaging can draw the package tightly around the contents, thereby immobilizing the product within the package. Vacuum packaging is particularly valuable for sealing sterilized medical devices, implants and instruments. The sealed package may form a barrier such that if the device is sterilized after the vacuum packaging (via a penetration sterilization method such as, but not limited to, gamma irradiation or E-Beam irradiation), the device maintains its sterility over a period of time.

In the field of medical devices, it is commonplace for pre-packaged components to be provided to the medical personnel. The components are sterilized and must be maintained in sterile condition until the package is opened in the operating room. For instance, in certain orthopedic surgical procedures, components of an orthopedic implant are provided in a sterilized and sealed bag. The implant is cleaned and packaged in a controlled environment and then sterilized. In many cases, the vacuum, maintained by the seals of the package, prevents oxidation of the device in the package. It is of particular interest that the sterilization process may alter the molecular structure of the device and that the absence of oxygen often prohibits the oxygen from combining with the molecular structure of the device and prevents oxidation of the device. Under these conditions, it is essential that the seal and the vacuum be maintained in the product packaging to preserve the sterility and/or the material properties and shelf life of the implant.

For products such as medical implants, care must be taken with the product itself during the packaging and sealing process. Thus, unlike mass production of vacuum sealed products, such as food, medical implants are typically individually packaged and sealed by a packaging operator. Individual package machines are known that meet these low volume packaging requirements. One such system is sold by Multivac Sepp KG, and is depicted in U.S. Pat. No. 5,056,292. In this system, opposing sealing bars are clamped about the package opening and heated by an electrical pulse.

Impulse sealing systems, such as the system depicted in the '292 Patent, are very adequate to create a vacuum or air-tight seal of the package. However, impulse sealing systems suffer from some drawbacks. For instance, most impulse sealing systems must be "primed" before statistically capable sealing operations can begin. These priming cycles prepare the sealing bar for the quick bursts of electrical energy/voltage that will be subsequently used to instantaneously increase the temperature of the bar. The priming is necessary to build a baseline seal wire temperature such that subsequent sealing cycles will yield statistically capable and controlled seal strengths. The statistically capable and in controlled sealing process is required for medical device special processes, such as seal validation studies. Even still, the baseline temperature is in a constant state of thermal cooling until the next seal is initiated. While the impulse sealing process is generally reliable and repeatable, a deficient sealing temperature may or may not be known until a package seal has been attempted. If the seal is inadequate by visual examination, the package must be scrapped and the contents repackaged. If the baseline temperature cools excessively, the seal strength may not be statistically as strong as those with higher baseline temperatures.

There remains a need for a vacuum packaging machine that reliably produces a sealed vacuum package.

SUMMARY OF THE INVENTION

To address this need, the present invention contemplates a modification to a vacuum packaging machine, and particularly to the sealing mechanism of the machine. The machine can include a chamber for receiving a product-carrying package to be sealed. The machine further includes a sealing mechanism that is configured to seal the open end of the package. In one embodiment, the open end of the package is sealed along an edge of the package, so that the sealing mechanism is provided in the form of opposing bars. The bars can include a wire or conductive mass that increases in temperature in response to a current flowing therethrough. Alternatively, the sealing bars can be configured to perform the heating and sealing function. The sealing mechanism is further configured to apply pressure to the open end of the package during the heating and sealing operation.

The packaging machine in one embodiment includes a plate for supporting the product package and a manually movable cover configured to form an air-tight seal in the chamber surrounding the product. The sealing mechanism is arranged so that the opposing bars squeeze the open end of the package between the bars when the packaging machine is closed. In a preferred embodiment, one of the sealing bars is generally stationary with respect to the product support plate, while the other sealing bar moves with the cover. In another embodiment, the sealing bars oppose each other at all times and the cover forms an air-tight chamber such that the chamber and thereby the package may be evacuated and/or flushed and sealed under a vacuum.

In one aspect of the invention, at least one of the sealing bars of the sealing mechanism is continuously heated. Preferably only one of the sealing bars is heated, and most preferably the sealing bar that moves with the cover. The temperature of the sealing bar is monitored and maintained by an electrical controller. In addition, the controller can sense a sealing bar temperature that is outside an accepted range of sealing temperatures, and can terminate the vacuum sealing process in response thereto.

In a preferred embodiment, the sealing bars are brought into proximity about the open end of the product-carrying package when the chamber cover is closed. The electrical controller may communicate with a vacuum pump and/or valving that can draw a vacuum in the chamber in response to closing of the chamber cover. If the requisite vacuum is not drawn within a pre-determined time period, the controller can issue an error signal and terminate the vacuum sealing process. Once the required vacuum is achieved within the chamber, an optional flushing of an inert gas may occur to displace any scavenger gas such as oxygen any multiple of times, followed by an optional vacuum pull down. The controller can then assess the sealing bar temperature.

If the sealing bar temperature is within an acceptable range, the controller can direct the sealing bars to clamp about the open end of the package. Since at least one of the sealing bars is constantly heated, there is no need to provide an electrical pulse to heat the sealing bar. Moreover, since the bar is continuously heated, the sealing process begins immediately when the heated bar contacts the package material. A pre-determined dwell time can be measured by the electric controller corresponding to the time necessary to completely fuse and/or seal the packaging material at the open end. When the dwell time expires, the controller can cause the heated sealing bar to retract, and commence re-pressurization of the vacuum chamber. Once the chamber pressure has reached a pre-determined level—preferably atmospheric pressure—the controller can actuate the cover to open, or the cover may open due to the equalization of pressure and under the influence of balance spring. When the cover is opened, the heated sealing bar is clear of the package, allowing the operator to remove the package and place a new, un-sealed product-carrying package on the chamber support plate.

It is one object of the invention to provide a vacuum packaging machine that eliminates the detriments of prior packaging machines. One benefit of the invention is that sealed package yields can be increased with improved consistency and reliability. Other objects and benefits of the invention will be appreciated upon consideration of the following written description, along with the accompanying figures.

DESCRIPTION OF THE PREFERRED EMBODIMENTS

Figure 1:
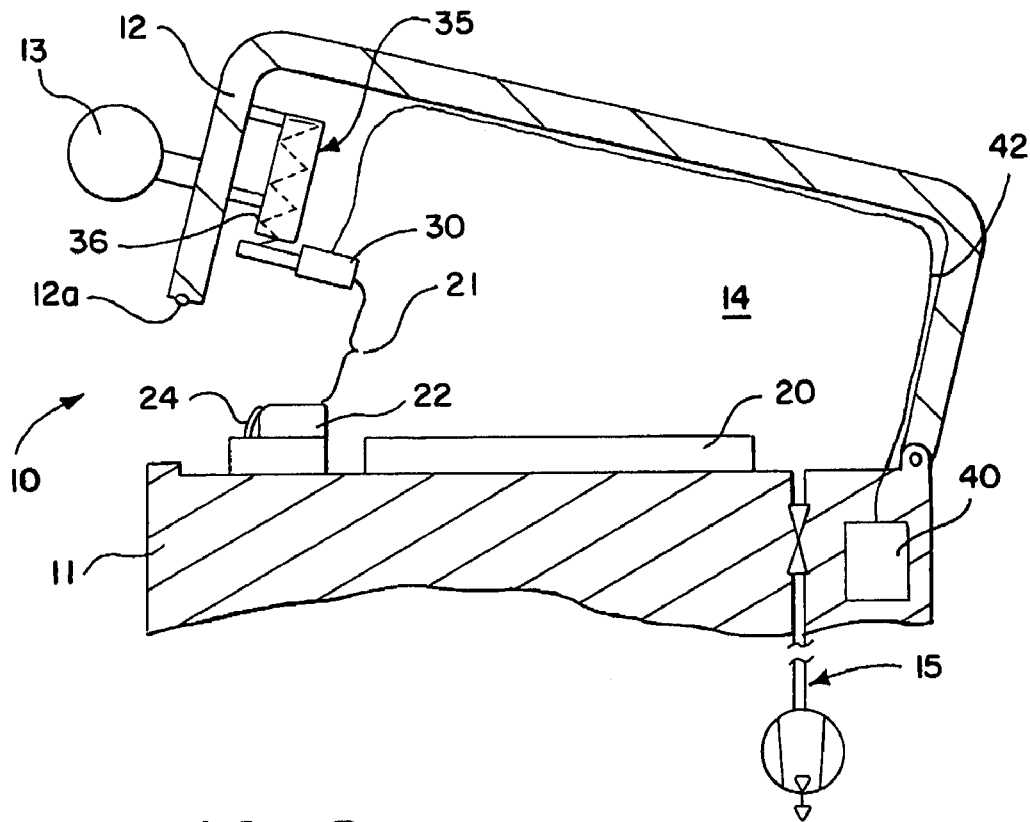
FIG. 1 is a side partial cross-sectional view of a vacuum packaging machine in accordance with one embodiment of the present invention, with the machine shown in its open configuration.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

The present invention contemplates a vacuum chamber packaging machine 10 that can be physically similar to known packaging machines. For example, the machine can be similar to the packaging machine described in U.S. Pat. No. 5,056,292, the disclosure of which is incorporated herein by reference. The basic elements of the machine 10 include a frame or support 11, and a chamber cover 12 that is mounted to the support. The cover can be pivotably mounted, as shown in FIG. 1. The pivot mount can include a torsion spring mechanism that biases the cover to its open position. A handle 13 can be provided on the cover to allow manual opening and closing. The cover 12 can include a sealing member 12a around the perimeter of the cover. The cover 12 and frame 11 combine to define a chamber 14.

A vacuum generator 15 communicates with the chamber 14 and is operable on command to draw a vacuum in the chamber and its contents. The vacuum generator 15 can be of conventional design and can be controllable to produce and hold a pre-determined vacuum. In a preferred embodiment, the generator is capable of pulling a vacuum of less than about 12 millibar, although other vacuum levels may be provided for specific packaging applications. The vacuum generator 15 can be accompanied by a gas flushing system (not shown) that is operable to flush the chamber 14 with an inert gas, such as nitrogen. The flushing system can be operated to purge the chamber and its contents of oxygen prior to and/or after the vacuum generation step. The vacuum generator 15 can pull a vacuum after the flushing if required.

Figure 2:
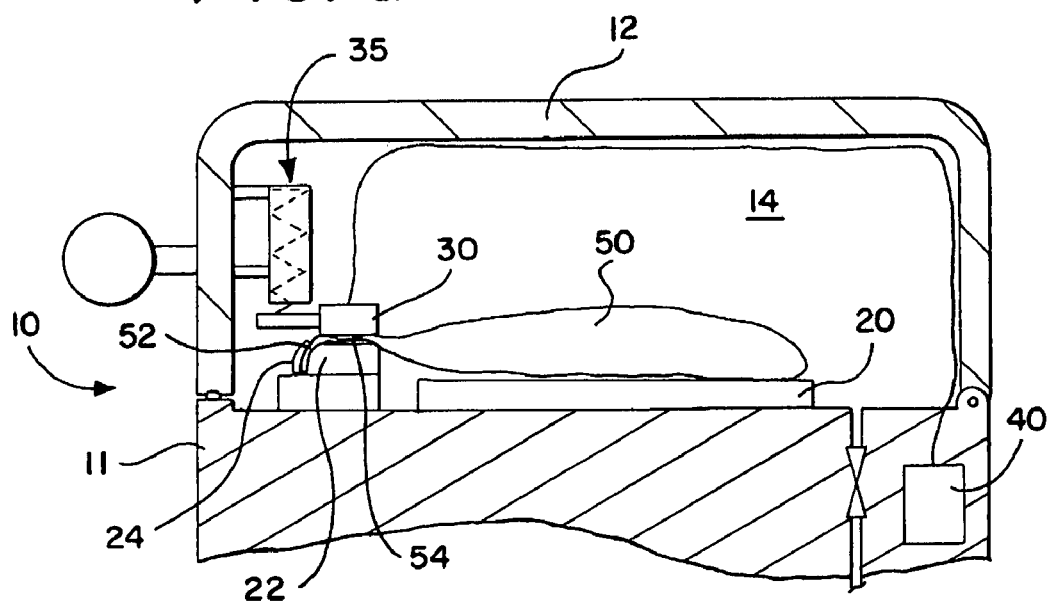
FIG. 2 is side partial cross-sectional view of the vacuum packaging of FIG. 1, shown in its closed, sealing configuration.

The frame 11 supports a plate 20 onto which the package to be sealed is placed. The plate 20 is adjacent the sealing mechanism 21 so that an open package can be situated on the plate with its open end within the sealing mechanism (as shown in FIG. 2). The sealing mechanism 21 includes a lower sealing bar 22 and an upper bar 30. The lower bar 22 can include a clamp 24 configured for holding the open end of the package within the sealing mechanism. In one embodiment, the sealing bar can be in the form of resilient clips bearing against the front edge of the lower bar 22, as shown in FIG. 1. Of course, other means, or no means, for holding the open end of the package can be provided.

In the preferred embodiment, the lower bar 22 is held stationary on the frame 11. Alternatively, the bar can be resiliently supported on the frame so that the bar deflects slightly when the upper bar 30 bears against it and the package end trapped between the two bars. In yet another embodiment, the upper bar 30 may be stationary with respect to the cover 12 and the lower sealing bar 22 may actuate towards the upper bar 30 to create sealing pressure.

Again in the preferred embodiment, the upper bar 30 is mounted so that it can deflect when applying pressure to the package open end. Thus, the upper bar 30 can be supported on the cover 12 by a support member 35. The support member 35 can take on a variety of configurations. For instance, the support member 35 can include an actuator 36 that is operable to extend and retract the upper bar 30. Alternatively, the support member 35 can include a resilient member that deflects as the upper bar bears down against the package end and the lower bar 22. With this alternative, the upper bar must be positioned so that it contacts the lower bar when the cover 12 is closed over the frame. The associated resilient members can deflect as the fixed lower bar pushes against the movable upper bar.

Preferably, the support member 35 includes the actuator 36 so that the bar can be extended and retracted under automatic control. With this approach, the heated bar does not contact the package until a vacuum has been drawn in the chamber 14. Moreover, the actuator 36 can retract the bar 30 to a safe location when the cover 12 is opened. Alternatively, the lower jaw 22 may actuate at the time of sealing and the upper jaw 30 can remain stationary relative to the cover 12. In another embodiment, the actuator 36 and upper jaw 30 are not attached to the cover 12, but are supported by a frame associated with the lower jaw 22 in a known manner.

In an important feature of the invention, the sealing mechanism 21 is constantly heated, preferably at the optimum sealing temperature for the package material. Most preferably, only the upper bar 30 is continuously heated. In the illustrated embodiment, the lower bar 22 is fixed so that it will contact the open end of the package when the product-filled package is loaded into the machine 10. If the lower bar is heated in this circumstance, the package would be prematurely melted and/or sealed. As an alternative, the lower bar 22 can be retractably mounted to the frame 11, with appropriate accommodations for supporting the open end of the package within the sealing mechanism 21. With this alternative, the lower bar 22 can also be continuously heated.

The heated bar (whether the upper bar 30, lower bar 22 or both) is preferably constructed in a known manner. For instance, the bar can include a resistance wire that becomes heated when connected to an electric current source. Alternatively, the bar itself can constitute a resistance heating element. The exact form of the heated bar, such as bar 30, is not critical to the present invention, so long as it is constantly maintained at a temperature at or near the optimum sealing temperature for the package material.

The temperature of the heated upper bar 30 (in the illustrated embodiment) is controlled by a control unit 40 that is preferably supported by the frame 11. The control unit 40 preferably includes a current source that can be connected to the heated bar 30 by way of a wiring system 42. The control unit also includes an electrical controller that operates to maintain the heated bar at a constantly elevated temperature. In one embodiment, the elevated temperature can be the optimum sealing temperature. In an alternative embodiment, the bar can be maintained at an elevated temperature that is less than the optimum sealing temperature. In this alternative embodiment, the control unit 40 can be operable to increase the bar temperature when the sealing operation is to occur.

The control unit 40 further includes control circuitry for the operation of the actuator 36. In the preferred embodiment, the control circuitry can be an electrical circuit that activates an electrical actuator, such as a solenoid, at pre-determined times in the vacuum sealing process. Optionally, the control circuitry can include a hydraulic circuit where the actuator 36 is hydraulic or pneumatic. In this case, the appropriate fluid conduits must be connected to the actuator 36, preferably following the path of the control wiring 40 shown in FIG. 1.

The control unit 40 also preferably includes an automatic control circuit that provides for timed operation of the components of the packaging machine 10 when initiated by an operator. The control unit 40 in this preferred embodiment would control the operation of the vacuum generator 15, the actuator 36 and the sealing mechanism 21. In an optimum configuration, the control unit 40 initiates the timed sequence of events when the cover 12 is closed on the frame 11. An appropriate sensor can be provided to sense the cover closing and activate timing circuits within the control unit 40.

The control unit 40 can include a temperature sensor mounted adjacent or on the heated upper bar 30. The temperature sensor can transmit a signal to the control unit that can compare the sensed temperature to a pre-determined set temperature. If the sensed temperature does not match the requisite temperature at any point during the vacuum sealing cycle, the control unit 40 can issue an alarm and the process terminated. Thus, if the heated sealing bar 30 is not heated to the proper temperature, the package need not be disturbed by premature contact with the sealing mechanism 21. Optimally, the control unit is operable to maintain the sealing bar temperature within one degree of the optimum sealing temperature.

Figure 3:
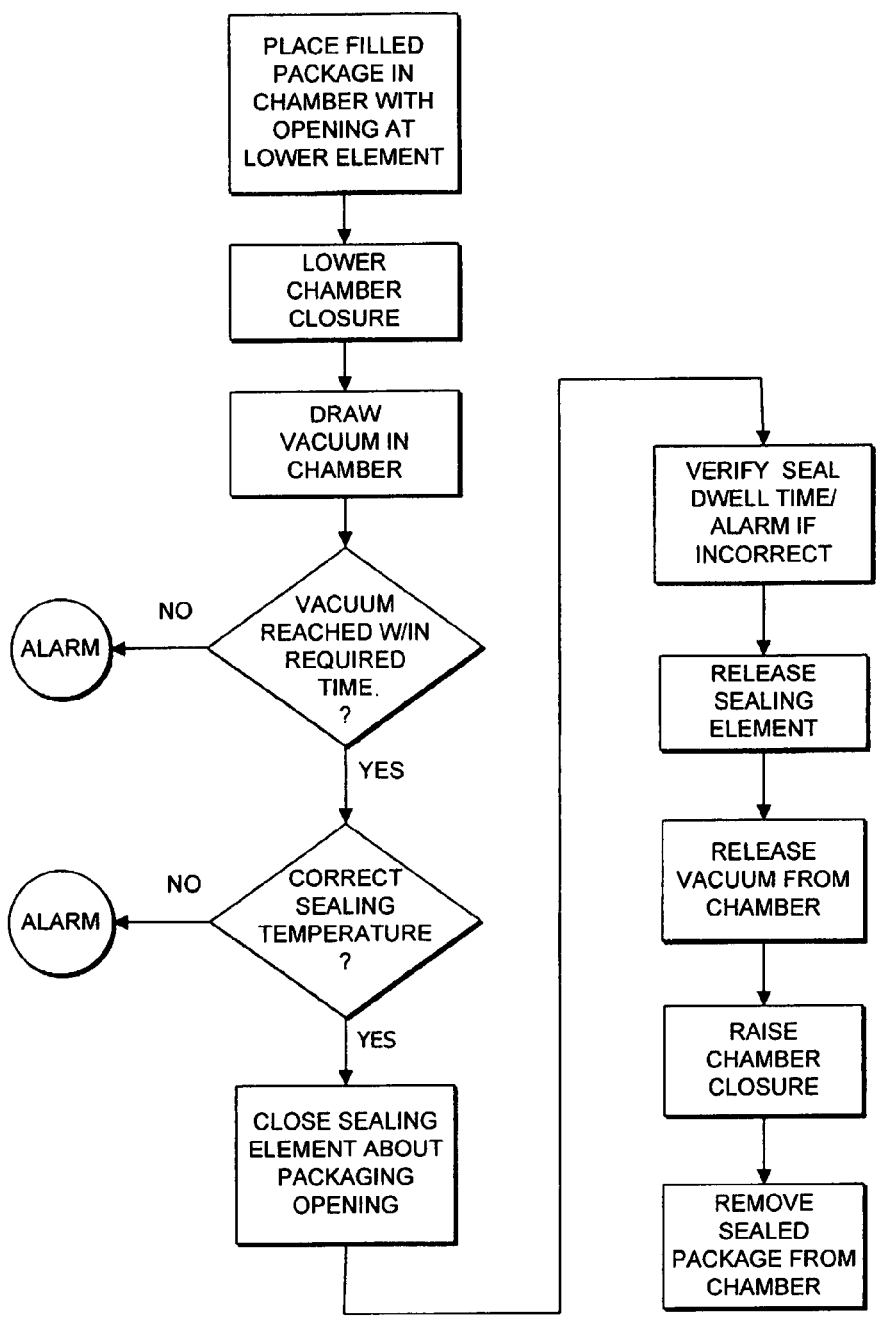
FIG. 3 is a flow-chart depicting the steps of operation of the packaging machine show in FIGS. 1 and 2.

One embodiment of the operation of the machine 10 is depicted in FIG. 2 and demonstrated in the flowchart of FIG. 3. As shown in FIG. 2, the product-filled package 50 is positioned on the plate 20 within the chamber 14. The package is situated so that its open end 52 is situated over the lower sealing bar 22, and preferably held in place by one or more clamps 24. A sealing region 54 of the package 50 is thus oriented within the sealing mechanism 21.

Once the package is properly positioned, the operator can close the cover 12. At that point, the control unit 40 can automatically initiate the vacuum sealing process. Alternatively, an operator controlled switch can be activated to initiate the control unit. When the process is commenced, the vacuum generator 15 (FIG. 1) is activated to draw a vacuum in the chamber 14. (If a gas purging system is provided, the purging step can be initiated and completed before the vacuum is drawn). The control unit 40 can be configured to stop the vacuum generator 15 at a pre-determined vacuum pressure, and can periodically activate the generator as necessary during the remainder of the sealing process to maintain the proper vacuum. The control unit 40 can determine whether the proper vacuum level has been reached in the required time. If not, the unit can issue an alarm and the process is terminated.

Once the chamber 14 has been evacuated, the actuator 36 can be initiated by a signal from the control unit 40. The actuator then extends the heated bar 30 to contact and exert pressure on the sealing region 54 of the package 50. The combination of heat and pressure over a pre-determined dwell time will seal the open end 52 of the package. This dwell time is controlled by the control unit 40 and can be calibrated to the particular package material. In the preferred embodiment, the control unit 40 can be modified for a variety of package materials or can include stored information concerning the proper heating regimen for particular materials. For instance, typical package materials for medical components can include barrier materials of PE, THIPS, XT Polymers, ADH, EVOH, foil bags of LDPE, LLDP or PET, or Nylon bags.

The control unit 40 can determine whether the sealing bar 30 maintains its set temperature during the dwell time. If not, the unit can issue an alarm and terminate the process. When the dwell time has been reached, the control unit signals the actuator 36 to release the upper sealing bar 30 (or the lower bar or both, depending upon the configuration of the sealing mechanism). The vacuum generator is disengaged (if not already inactive), and the vacuum is released from the chamber 14. Once the interior pressure has increased to a pre-determined level (preferably atmospheric), the control unit 40 can raise the chamber cover 12. An appropriate actuator can be connected to the cover to raise the cover at this point in the sealing cycle. (The same actuator can be used to close the cover, in lieu of the manual handle 13, upon activation of a switch). Alternatively the cover 12 may raise by the equalization of pressure and torsion from a spring counterbalance mechanism. Once the cover has been raised, the operator can remove the vacuum sealed package from the chamber 14.

In the preferred embodiment, the control unit 40 includes a programmable microprocessor. The microprocessor can include a database of vacuum sealing parameters, such as sealing bar temperature and dwell requirements for particular package materials. Thus, the same vacuum packaging machine 10 can be used to seal many different types of product packages. The microprocessor can be operable to change the vacuum sealing parameters with each new cycle as desired by the operator. The control unit 40 can include appropriate systems to verify loading of the proper parameter values before initiating a new vacuum sealing cycle.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance the illustrated embodiment is built around a vacuum sealing machine such as the machine depicted in the '292 Patent described above. The inventive concepts can be readily implemented in a wide variety of vacuum sealing machines, and is most readily applicable to "single shot" machines that rely upon manually loading a single, or at most a few, packages to be sealed.

What is claimed is:

1. A method for vacuum sealing a package comprising the steps of:
   supporting a package within a vacuum chamber with the open end of the package between sealing bars of a sealing mechanism disposed within the chamber;
   generating a vacuum in the chamber;
   closing the sealing bars about the open end of the package after generating the vacuum; and
   continuously heating at least one sealing bar during each of the supporting, generating, and closing steps.

2. The method for vacuum sealing according to claim 1, further comprising continuously monitoring the temperature of the one sealing bar and maintaining the temperature at a predetermined value.

3. The method for vacuum sealing according to claim 1, wherein the generating, closing and continuously heating steps are automatically controlled.

4. The method for vacuum sealing according to claim 3, in which the vacuum chamber has a cover and the generating and closing steps are initiated when the cover is closed over the package within the chamber.

5. The method for vacuum sealing according to claim 1 further comprising the step of releasing the sealing bars from the open end of the package after a pre-determined dwell time.

6. A vacuum packaging machine comprising:
   a chamber;
   a vacuum generator which generates a vacuum within said chamber;
   a sealing mechanism disposed within said chamber and including opposing sealing bars arranged to receive the open end of a package disposed within said chamber and operable to close the sealing bars about the open end of the package; and
   means for continuously heating at least one sealing bar when said vacuum generator is operated to generate said vacuum and said sealing mechanism is operated to close said sealing bars about the open end of the package.

7. The vacuum packaging machine according to claim 6, wherein said means for continuously heating includes:
   an element in said at least one sealing bar heated in response to an electric current; and
   a control device operable to continuously connect said element to a source of electric current.

8. The vacuum packaging machine according to claim 7, wherein said means for continuously heating includes a temperature sensor associated with said element, and said control device is operable to control the current provided to said element as a function of the element temperature sensed by said temperature sensor.

9. The vacuum packaging machine according to claim 6, wherein:
   said chamber is defined by a frame and a cover mounted on said frame for movement between an open position in which said chamber is externally accessible and a closed position in which said chamber is sealed from the atmosphere; and
   said sealing mechanism includes a support mechanism supporting said at least one sealing bar on said cover.

10. The vacuum packaging machine according to claim 9, wherein said support mechanism includes an actuator operable to extend said at least one sealing bar into contact with the open end of the package when said cover is closed on said frame.

11. The vacuum packaging machine according to claim 10, further comprising a controller operable to activate said actuator to extend said sealing bar in response to said cover being closed on said frame, and to retract said sealing bar after the open end of a package has been sealed by said sealing bar.

12. The vacuum packaging machine according to claim 9, wherein said means for continuously heating includes:
   an electrical control device supported by said frame and including a current source; and
   wiring connecting said electrical control device to said at least one sealing bar,
   wherein said electrical control device is operable to connect said wiring to said current source.

13. The vacuum packaging machine according to claim 12, wherein said electrical control device is operable to control the current provided to said sealing bar to maintain a pre-determined temperature of said sealing bar.

14. A vacuum packaging machine comprising:
   a chamber;
   a vacuum generator which generates a vacuum within said chamber;
   a sealing mechanism disposed within said chamber and including opposing sealing bars arranged to receive the open end of a package disposed within said chamber and operable to close the sealing bars about the open end of the package; and
   a heater which is continuously connected to a source of current to generate heat with at least one of said opposing sealing bars when (i) said vacuum generator is operated to generate said vacuum, and (ii) said sealing mechanism is operated to close said opposing sealing bars about the open end of the package.

15. The vacuum packaging machine according to claim 14, wherein said heater includes a temperature sensor associated with an element, and said control device is operable to control the current provided to said element as a function of an element temperature sensed by said temperature sensor.

16. The vacuum packaging machine according to claim 14, wherein:
   said chamber is defined by a frame and a cover mounted on said frame for movement between an open position in which said chamber is externally accessible and a closed position in which said chamber is sealed from the atmosphere; and
   said sealing mechanism includes a support mechanism supporting said at least one sealing bar on said cover.

17. The vacuum packaging machine according to claim 16, wherein said support mechanism includes an actuator operable to extend said at least one sealing bar into contact with the open end of the package when said cover is closed on said frame.

18. The vacuum packaging machine according to claim 17, further comprising a controller operable to activate said actuator to extend said sealing bar in response to said cover being closed on said frame, and to retract said sealing bar after the open end of a package has been sealed by said sealing bar.

* * * * *